US012475018B2

(12) United States Patent
Zavesky et al.

(10) Patent No.: US 12,475,018 B2
(45) Date of Patent: Nov. 18, 2025

(54) UTILIZATION OF A RESOURCE TO PERFORM A TASK BASED ON A PREDICTED CAPACITY OF THE RESOURCE

(71) Applicant: AT&T Intellectual Property I, L.P., Atlanta, GA (US)

(72) Inventors: Eric Zavesky, Austin, TX (US); Ni An, Fremont, CA (US); Prateek Baranwal, Dallas, TX (US); Kelly Dowd, Dallas, TX (US); James Pratt, Round Rock, TX (US); Emily Williams, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 517 days.

(21) Appl. No.: 17/816,187

(22) Filed: Jul. 29, 2022

(65) Prior Publication Data

US 2024/0037007 A1    Feb. 1, 2024

(51) Int. Cl.
*G06F 11/34*    (2006.01)
*G06F 9/50*    (2006.01)

(52) U.S. Cl.
CPC .......... *G06F 11/3442* (2013.01); *G06F 9/505* (2013.01)

(58) Field of Classification Search
CPC ................. G06F 11/3442; G06F 9/505; G06F 2209/5019
See application file for complete search history.

(56) References Cited

U.S. PATENT DOCUMENTS

| 11,023,843 | B2 * | 6/2021 | Acuna .............. G06Q 10/06393 |
| 11,763,223 | B1 | 9/2023 | Gupta et al. |
| 11,984,739 | B1 | 5/2024 | Smith et al. |
| 2005/0060217 | A1 * | 3/2005 | Douglas ................ G06Q 10/06 705/7.14 |
| 2008/0109289 | A1 | 5/2008 | Vivadelli et al. |

(Continued)

FOREIGN PATENT DOCUMENTS

| WO | 2009026238 A2 | 2/2009 |
| WO | 2018180743 A1 | 10/2018 |
| WO | 2023182560 A1 | 9/2023 |

OTHER PUBLICATIONS

Sato, "Reselling Gig Work is Tiktok's Newest Side Hustle," The Verge, https://www.theverge.com/22905356/gig-work-drop-shipping-fiverr-tiktok, Feb. 9, 2022, 9 pages.

(Continued)

*Primary Examiner* — Dong U Kim
(74) *Attorney, Agent, or Firm* — Guntin & Gust, PLC; Dana B. LeMoine

(57) ABSTRACT

The technologies described herein are generally directed to allocating a resource to perform a task based on a predicted capacity of the resource. For example, a method described herein can include identifying a selected capacity associated with completion of tasks of a particular task type. Further, the method can include, evaluating a result of work by a worker resource performing a task of the particular task type. The method can further include, based on the result, predicting that the worker resource has the selected capacity and, based on this prediction, assign the worker resource to perform another task of the particular task type.

20 Claims, 10 Drawing Sheets

(56) References Cited

U.S. PATENT DOCUMENTS

| | | | |
|---|---|---|---|
| 2009/0248704 A1 | 10/2009 | Greenwell et al. | |
| 2017/0086729 A1* | 3/2017 | Bruno | A61B 5/16 |
| 2018/0330302 A1 | 11/2018 | Peterson et al. | |
| 2019/0197011 A1 | 6/2019 | Zavesky et al. | |
| 2020/0110687 A1 | 4/2020 | Hu et al. | |
| 2020/0134526 A1* | 4/2020 | Haga | G06Q 10/06313 |
| 2020/0411168 A1* | 12/2020 | Thomas | G06Q 10/06311 |
| 2022/0310262 A1 | 9/2022 | Ramos et al. | |
| 2024/0037469 A1 | 2/2024 | Dowd et al. | |
| 2024/0289648 A1* | 8/2024 | Donnart | G06N 20/00 |

OTHER PUBLICATIONS

Okano et al., "Sleep quality, duration, and consistency are associated with better academic performance in college students," npj Sci. Learn. 4, 16 (2019), 5 pages.

\* cited by examiner

UTILIZATION OF A RESOURCE TO PERFORM A TASK BASED ON A PREDICTED CAPACITY OF THE RESOURCE

TECHNICAL FIELD

The subject application is related to different approaches to managing resources for the performance of tasks and, for example, to managing resource capacity for handling tasks.

BACKGROUND

As resources that can be used for performance of organizational tasks continue to increase in complexity, managing the capacity of different resources to perform different tasks has become increasingly difficult. Problems can occur when worker resources of different capabilities are required to complete complex tasks.

These problems can be aggravated by the evolving character of some capabilities and tasks, e.g., as tasks evolve to handle more complex technologies, the evolution in capabilities required to perform tasks is often not managed.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
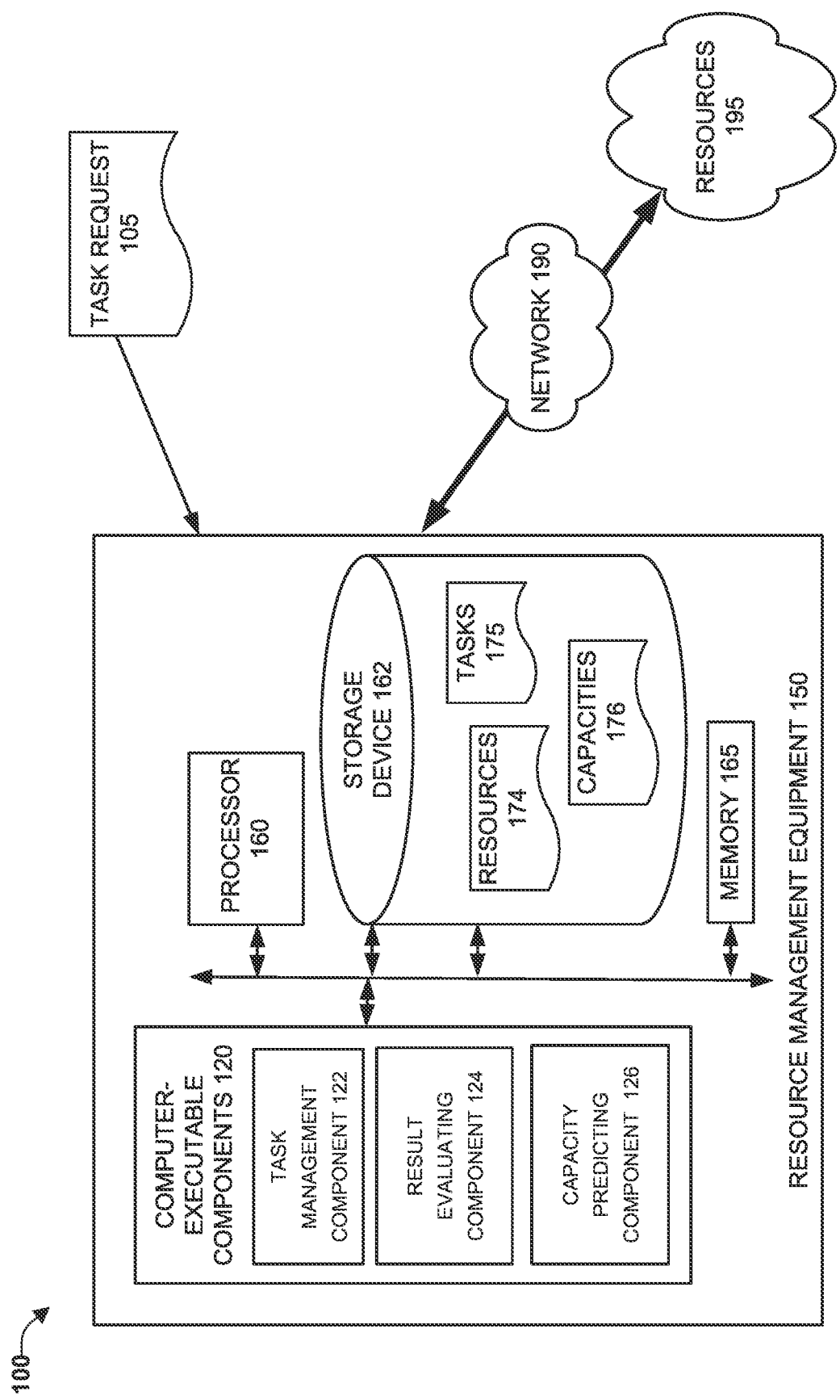
FIG. 1 is an architecture diagram of an example system that can facilitate allocating a resource to perform a task based on a predicted capacity of the resource, in accordance with one or more embodiments.

Generally speaking, one or more embodiments of a system described herein can facilitate allocating a resource to perform a task based on a predicted capacity of the resource. In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any radio access technology (RAT) or multi-RAT system where the UEs operate using multiple carriers, e.g., LTE.

One having skill in the relevant art(s), given the disclosure herein understands that the computer processing systems, computer-implemented methods, equipment (apparatus) and/or computer program products described herein employ hardware and/or software to solve problems that are highly technical in nature (e.g., evaluating related capacities of different resources), that are not abstract and cannot be performed as a set of mental acts by a human. For example, a human, or even a plurality of humans, cannot efficiently predict capacities for performing tasks by resources with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate allocating a resource to perform a task based on a predicted capacity (also termed capabilities or skills herein) attributable the resource. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate allocating a resource to perform a task based on a predicted capacity of the resource, in accordance with one or more embodiments. For purposes of brevity, description of like elements and/or processes employed in other embodiments is omitted. As depicted, system 100 includes resource management equipment 150 receiving task request 105. Resource management equipment 150 is further connected resources 195 via network 190.

In one or more embodiments, resource management equipment 150 can include computer executable components 120, processor 160, storage device 162 and memory 165. Computer executable components 120 can include task management component 122, result evaluating component 124, capacity predicting component 126, and other components described or suggested by different embodiments described herein, that can improve the operation of system 100. Storage device 162 can include linked collections of data, including resources 174, capacities 176, and tasks 175.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, resource management equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining task management component 122. As discussed with FIGS. 4-5 below, task management component 122 can, in accordance with one or more embodiments, identify a selected capacity associated with completion of tasks of a particular task type. For example, one or more embodiments can identify a selected capacity 176 associated with completion of tasks 175 of a particular task type.

Further, in another example, in one or more embodiments, computer executable components 120 can include instructions that, when executed by processor 160, can facilitate performance of operations defining result evaluating component 124. As discussed with FIGS. 3-4 below, result evaluating component 124 can, in accordance with one or more embodiments, evaluate a result of work by a worker resource performing a task of the particular task type. For example, in different implementations, one or more embodiments can evaluate a result of work by a worker resource 174 performing a task 175 of the particular task type.

In one or more embodiments, the result evaluated can include a performance metric for performance of the first task by the worker resource. Example performance metrics include, but are not limited to, a completion time for completion of the first task. Additionally, biometric data of the worker resource collected while performing the task can provide different indications of a level of competence performing a particular task.

In yet another example, computer executable components 120 can include instructions that, when executed by processor 160, can facilitate performance of operations defining capacity predicting component 126. As discussed herein, in one or more embodiments, capacity predicting component 126 can based on the result, predict that the worker resource has the selected capacity and, based on this prediction, assign the worker resource to perform another task of the particular task type. For example, one or more embodiments can based on the result, predict that the worker resource has the selected capacity 176 and, based on this prediction, assign the worker resource 174 to perform another task 175 of the particular task type.

Figure 2:
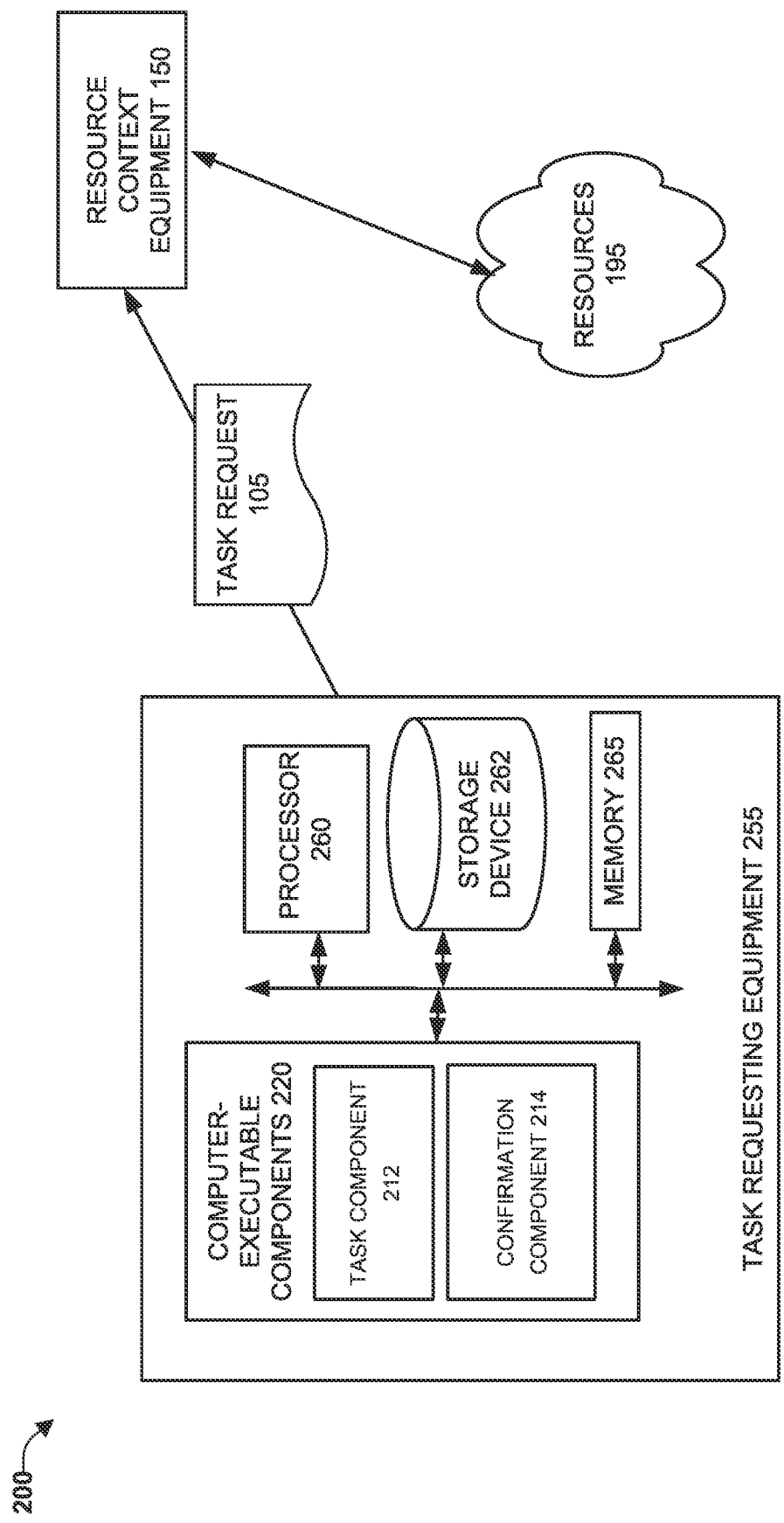
FIG. 2 is a diagram of a non-limiting example system that can facilitate allocating a resource to perform a task based on a predicted capacity of the resource, in accordance with one or more embodiments.

FIG. 2 is a diagram of a non-limiting example system 200 that can facilitate allocating a resource to perform a task based on a predicted capacity of the resource, in accordance with one or more embodiments. For purposes of brevity, description of like elements and/or processes employed in other embodiments is omitted.

As depicted, system 200 can include task requesting equipment 255 connected to resource management equipment 150 via network 190. In one or more embodiments, task requesting equipment 255 can include memory 265 that can store one or more computer and/or machine readable, writable, and/or executable components and/or instructions 220 that, when respectively executed by processor 260, can facilitate performance of operations defined by the executable component(s) and/or instruction(s).

In system 200, computer executable components 220 can include task component 212, confirmation component 214, and other components described or suggested by different embodiments described herein that can improve the operation of system 200. For example, in some embodiments, task requesting equipment 255 can further comprise various computer and/or computing-based elements described herein with reference to mobile handset 900 of FIG. 9 and operating environment 1000 described with FIG. 10.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining task component 212. As discussed below, in one or more embodiments, task component 212 can communicate to resource management equipment 150, a request to perform a task associated with a first capability.

In another example, in one or more embodiments, computer executable components 220 can include instructions that, when executed by processor 260, can facilitate performance of operations defining confirmation component 214. As discussed below, confirmation component 214 can, in accordance with one or more embodiments, receive a confirmation comprising a message that a worker resource has been allocated to perform the task, wherein the worker resource was selected based on an assessment that the worker resource has the first capability.

Figure 3:
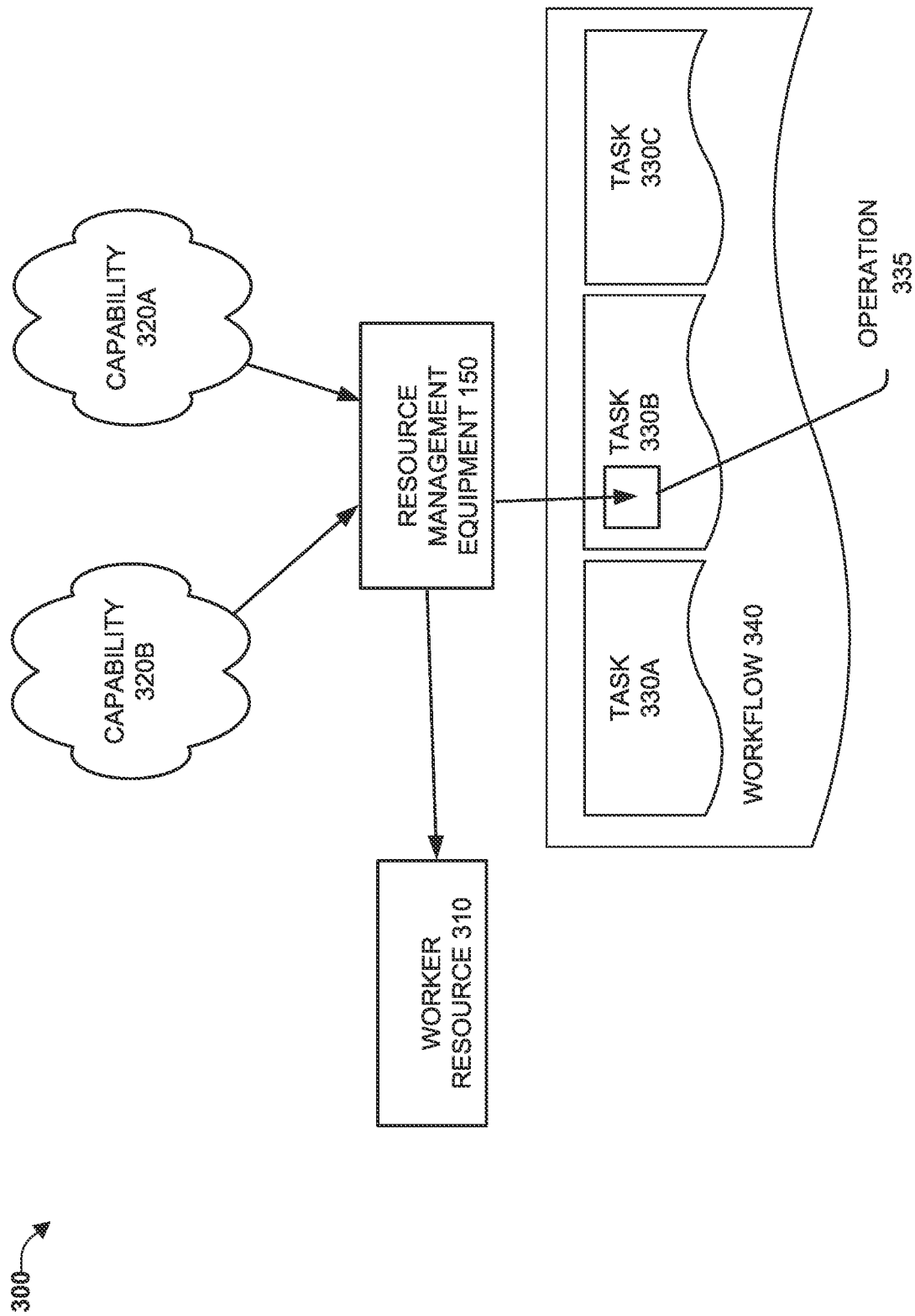
FIG. 3 is a diagram of a non-limiting example system that can facilitate allocating a resource to perform a task based on a predicted capacity of the resource, in accordance with one or more embodiments.

FIG. 3 is a diagram of a non-limiting example system 300 that can facilitate allocating a resource to perform a task based on a predicted capacity of the resource, in accordance with one or more embodiments. For purposes of brevity, description of like elements and/or processes employed in other embodiments is omitted. As depicted, system 300 shows Resource management equipment 150 connected to worker resource 310, capabilities 320A-B, and workflow 340.

In this example, workflow 340 includes tasks 330A-C, meaning that a workflow can require multiple capabilities 320A-B (e.g., task 330A implicates capability 320A, and task 330B implicates capability 320B. Based on this diversity of capabilities, it should be noted that completing workflow 340 can include the work of multiple resources 310, e.g., to have all of the capacities implicated by the collection of tasks 330A-C.

Adding additional detail applicable to some embodiments, FIG. 3 depicts an additional level of work organization for completion of workflow 340. In this example, task 330B can include the performance of multiple operations 335, with operations potentially implicating different capacities. For example, one or more embodiments can identify available worker capacity as an area where operation 335 can be utilized by one or more embodiments. Another area where operation 335 can be utilized by one or more embodiments is in the monitoring of the progress of tasks 330A-C within workflow 340. As noted above, results of tasks can be evaluated by one or more embodiments to access the capabilities of worker resources. In this example, when worker resource 310 is allocated to complete task 330B, after completion of operation 335, results can be assessed and, before another operation of task 330B is performed by worker resource 310, the attribution of capability 330B to worker resource 310 can be reassessed.

Based on the descriptions herein, it should be noted that one or more embodiments can determine capabilities implicated by different work performed by resources (e.g., workflow 340, tasks 330A-C, and operation 335), assign worker resources 310 based on predicted capabilities 320A-B, and periodically reassess the application of capabilities to both work performed and worker resources.

Figure 4:
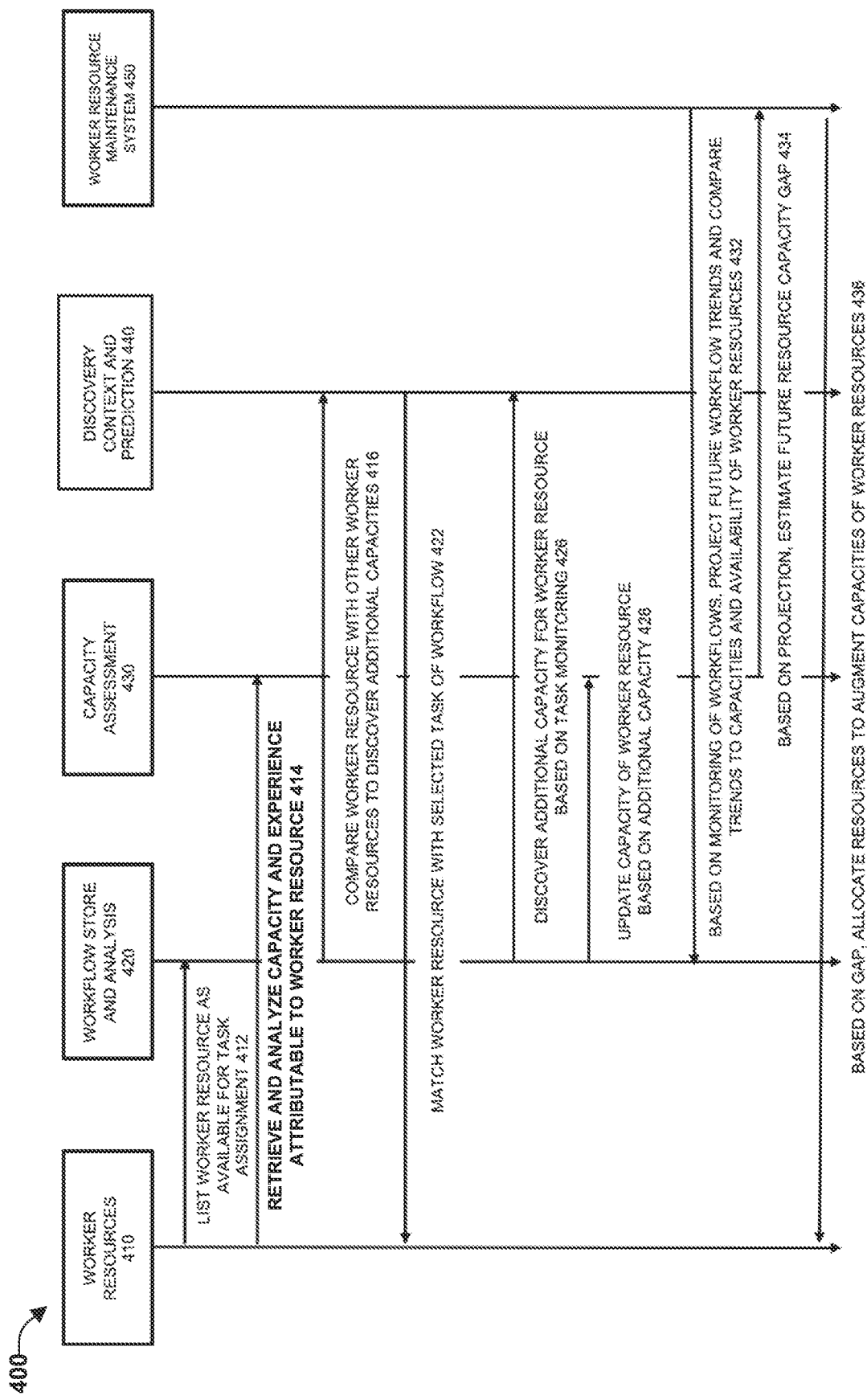
FIG. 4 depicts a flowchart of an example process that can facilitate allocating a resource to perform a task based on a predicted capacity of the resource, in accordance with one or more embodiments.

FIG. 4 depicts a flowchart of an example process 400 that can facilitate allocating a resource to perform a task based on a predicted capacity of the resource, in accordance with one or more embodiments. For purposes of brevity, description of like elements and/or processes employed in other embodiments is omitted. Elements of the flow diagram include worker resources 410, workflow store and analysis 420, capacity assessment, discovery, context, and prediction 440, and worker resource maintenance 450.

At 412, a worker resource 410 can be listed as available for assignment with workflow store and analysis functions 420. At 414, the capacities and experience attributable to the worker resource can be retrieved by capacity assessment 430. One way that a capacity can be attributed to a worker resource is to evaluate the worker resource as having a likelihood of success with the capacity that exceeds a threshold of success. It should be noted that capacities can be periodically reevaluated assist worker resource in maintaining the capacities. Evaluation subjects can include past activity and predictions of capacity of worker resources.

At 416, the worker resource can be compared by discovery, context, and prediction functions 440, with other worker resources to discover additional capacities. In example implementation of these features, to facilitate the identification of resource capacities, workflow 340 can be broken down into tasks 330 and operations 335, e.g., by going beyond observing capabilities 320 alone, one or more embodiments can provide more granular predictions and capacity alignment for different resources. At 422, discovery, context, and prediction functions 440 can match worker resource 410 a selected task of a workflow. At 426, based on monitoring the performance of a task by worker resource maintenance system 450, additional capacities can be discovered and attributable to the worker resource. In an example, one or more embodiments can identify, a capacity associated with completion of tasks of a task type and evaluate the capacity of a worker resource. In an example result of the evaluation, the capacity of the worker resource can be evaluated as being below a threshold level of capacity. Based on this deficiency, one or more embodiments can assign training resources to augment this capacity, e.g., by training classes. Another way that a capacity deficiency can be handled by embodiments is to identify other worker resources with the deficient capacity and allocate the other resource to work with the worker resource with the deficiency. In some circumstances the deficiency for one worker resource can be augmented by coupling one or more additional worker resources for the same task, e.g., when one or more embodiments predicts that this approach can provide some benefit. In one example, a first junior worker resource can be coupled with a second senior worker resource for a short amount of time to augment capacity of the junior worker resource with skills of the senior worker resource (e.g. "hands on experience") that may be hard to convey in traditional training materials. At 428, the capacity of the worker resource can be updated using the workflow store and analysis functions 420, based on the discovered additional capacity.

At 432, based on monitoring of workflows, workflow store and analysis functions 420 can project future workflow trends and compared the trends to capacities and availability of worker resources. In another example, the workflow selected 420 by one or more embodiments can be announced, published, or advertised to worker resources 410 such that a process of self-nomination by a first worker resource 410 can be executed. In some implementations, self-nomination can be observed by capacity assessment 428 and used in subsequent projections and trends 432 to derive benefits from the successful pairing of the first worker resource 410 with the selected workflow 420. Based at least on these approaches, worker pools can facilitate skill transfer by work with others in worker pool, and self-nomination and assessment can incorporate different beneficial results of the allocation of worker resources At 436, to remediate projected deficiencies in different capacities of worker resources, resources can be allocated by workflow store and analysis functions 420 to augment capacities of worker resources 410, maintain operational capability of worker resources 410, and procure additional worker resources 410.

In another example, operations at 436 can predict that additional worker resources should be acquired, retrained, shifted to alternate workflows, or released. In this example, to improve the use of additional worker resources, unlike traditional association of a worker resource 410 to non-specific capacity and skills, the system can maintain operational capability by combining gap estimate 434 and allocation 436 in a way that emphasizes workflow 340, task 330, or operation 335, e.g., as the basic unit of measurement which more tightly aligns to capabilities 320. In one or more embodiments, this allocated use of worker resource 410 can allow the resource to be more flexible in completion of tasks and can assess capacity needs for individual experiences 414. In another example, this assessment of individual worker resources 410 by tasks 330 and operations 335 can better facilitate the sharing of resources across an enterprise (e.g., horizontal collaboration) in addition to traditional sharing of worker resources 410 that shared mostly along workflow 420 and capacity 340 (vertical collaboration) alone. In some implementations, a 'gig economy' approach can be used by embodiments to improve the efficiency of work performed, even at the subtask level.

In other example embodiments, the output of step 436 can be utilized to describe knowledge across a worker resource 410 pool. For example, through monitoring and predictive capacity steps described here, an approach to indexing, summarization, and search of available worker resources 410 or their underlying capacities 430 can be presented in an interactive or notification-based service (not illustrated). In some implementations, this alerting service can directly communicate to one or more mechanisms for direct worker resource communication workflow modifications. In another example, discovery and prediction service 440 can be augmented to predict new hybrid tasks 330 or capabilities 320 that are not yet identified by worker resources explicitly, but that are required for capacity maintenance. In another embodiment, the system can observe and facilitate periods of dormancy, retraining, and recharging for worker resources 410. While not a direct task 330 or operation 335 in a workflow 340, periods of rest or shift away from a singular type of workflow assignments 420 can be assessed and assigned to individual worker resources 410 as required and instituted as retreats, sabbaticals, or culture building intervals. In another example, these periods of dormancy can be aligned to personal attributes of a worker resource 310 such as life changing events (new child, marriage, move to a new location) such that the system incorporates the availability change in capacity assessment 430 and predicts 440 required resources 410 modifications. In yet another example, worker resources 410 may be modified based on micro-observations, such as personal biometrics that indicate a period of excitement, stress, or satisfaction.

Figure 5:
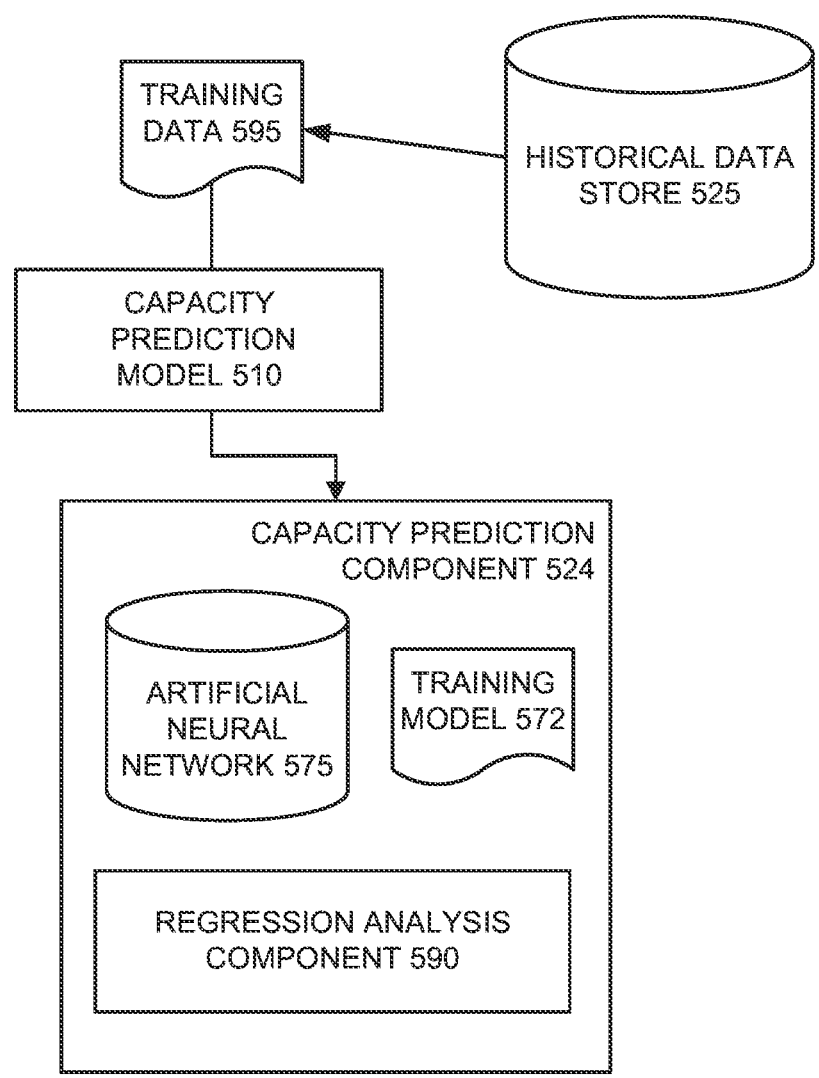
FIG. 5 illustrates an implementation of an example, non-limiting system that can use one or more machine learning approaches to facilitate prediction and discovery of resource capacities for worker resources performing tasks, in accordance with one or more embodiments.

FIG. 5 illustrates an implementation of an example, non-limiting system 500 that can use one or more machine learning approaches to facilitate prediction and discovery of resource capacities for worker resources performing tasks, in accordance with one or more embodiments. Repetitive description of like elements and/or processes employed in respective embodiments is omitted for sake of brevity. As depicted, system 500 can comprise capacity prediction component 524, historical data store 525, training data 595, and capacity prediction model 510. capacity prediction component 524 in this example can comprise artificial neural network (ANN) 575, ANN training model 572, and regression analysis component 590.

In certain embodiments, different functions of capacity prediction component 524 can be facilitated based on classifications, correlations, inferences and/or expressions associated with principles of artificial intelligence and machine learning. For example, capacity prediction component 524 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, comprising deep neural networks (DNN), reinforcement learning (RL), Bayesian Statistics, long short-term memory (LSTM) networks. One or more of the above approaches can be specified in capacity prediction model 510 can be used by capacity prediction component 370 to analyze one or more sources of network usage information discussed above.

In an example embodiment, the historical data store 525 can be comprised in information stored in ANN 575, that was trained by historical information associated with the resource management equipment 150. In additional embodiments, initial and subsequent training of ANN 575 can be based on collected production data stored in historical data store 525 that has been divided into training data 595 in a first data portion and optimizing data (e.g., testing, validation) in a second portion of data. In different approaches, these portions can be selected based on different approaches that comprise, but are not limited to, a random or pseudo-random selection process.

As would be appreciated by one having skill in the relevant art(s), given the description herein, different aspects of network data records (e.g., results of one or more embodiments with respect to prediction of different worker resource capacities) can be used to train ANN 575. Example values that can be assessed comprise, bandwidth utilization, quality of service metrics such as key performance indicators (KPIs) and key quality indicators (KQI), performance and configuration data collected by UE/eNodeB, along with different scenarios of interference detected and reported.

As would be appreciated by one having skill in the relevant art(s), given the description herein, after training by the first portion of data, the second portion of data, analysis results for the data, can be used to validate and update ANN 575, if needed. It should be noted that this description of employing an ANN is non-limiting, e.g., one or more embodiments can use other types of artificial intelligence and machine learning algorithms that receive input and perform capacity analysis as described above.

In another approach, machine learning (supervised learning) based solutions to analyze the types of data described above to generate predicted interference by different bands. As would be appreciated by one having skill in the relevant art(s), given the description herein, regression analysis component 590 can be used to apply a regression analysis approach to machine learning for embodiments, e.g., this approach being useful in some circumstances for analyzing data to generate different improved solutions to a problem.

Figure 6:
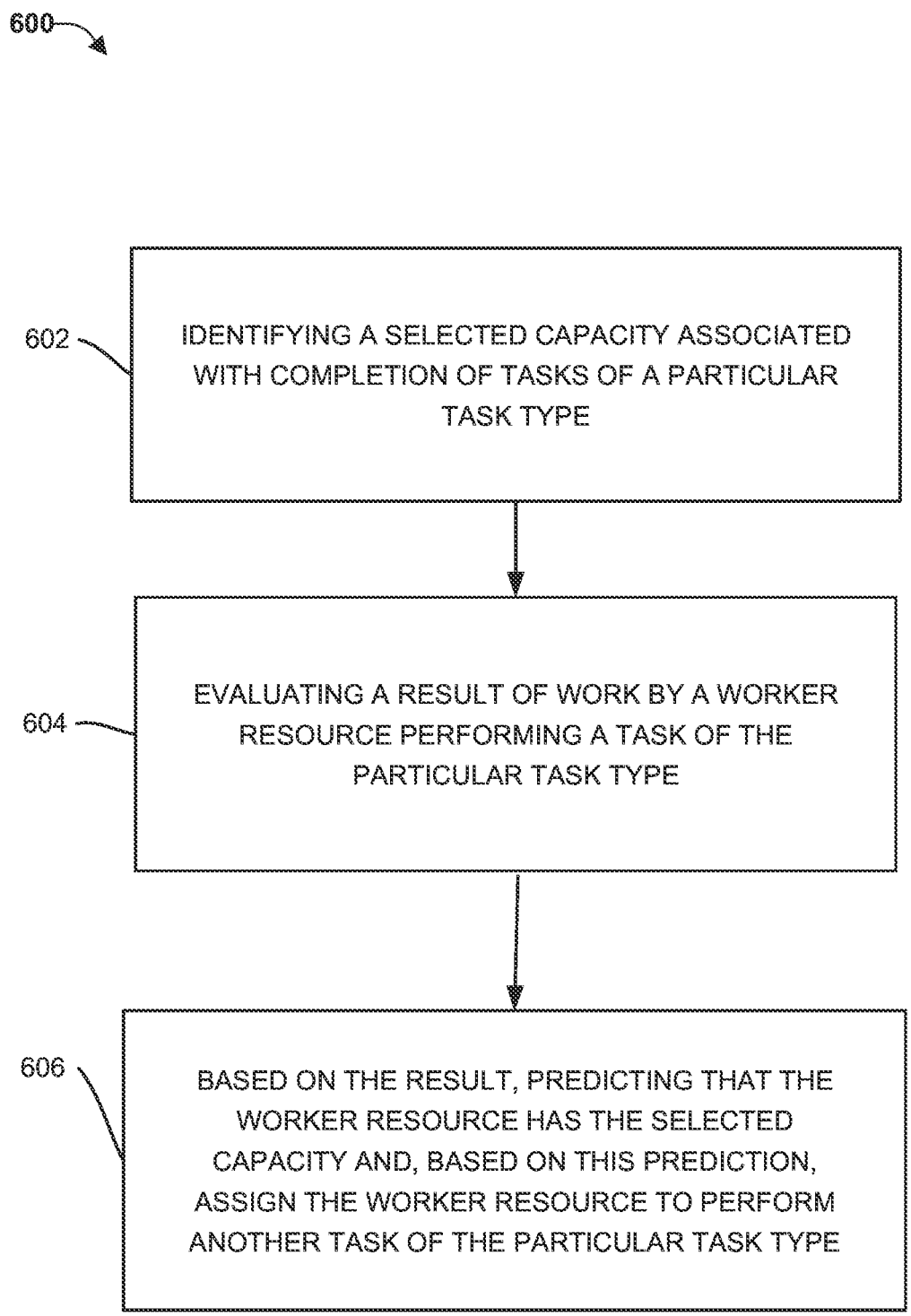
FIG. 6 illustrates an example method that can facilitate allocating a resource to perform a task based on a predicted capacity of the resource, in accordance with one or more embodiments.

FIG. 6 illustrates an example method 600 that can facilitate allocating a resource to perform a task based on a predicted capacity of the resource, in accordance with one or more embodiments. For purposes of brevity, description of like elements and/or processes employed in other embodiments is omitted.

At 602, method 600 can include identifying a selected capacity associated with completion of tasks of a particular task type. At 604, method 600 can include, evaluating a result of work by a worker resource performing a task of the particular task type. At 606, method 600 can include based on the result, predicting that the worker resource has the selected capacity and, based on this prediction, assign the worker resource to perform another task of the particular task type.

Figure 7:
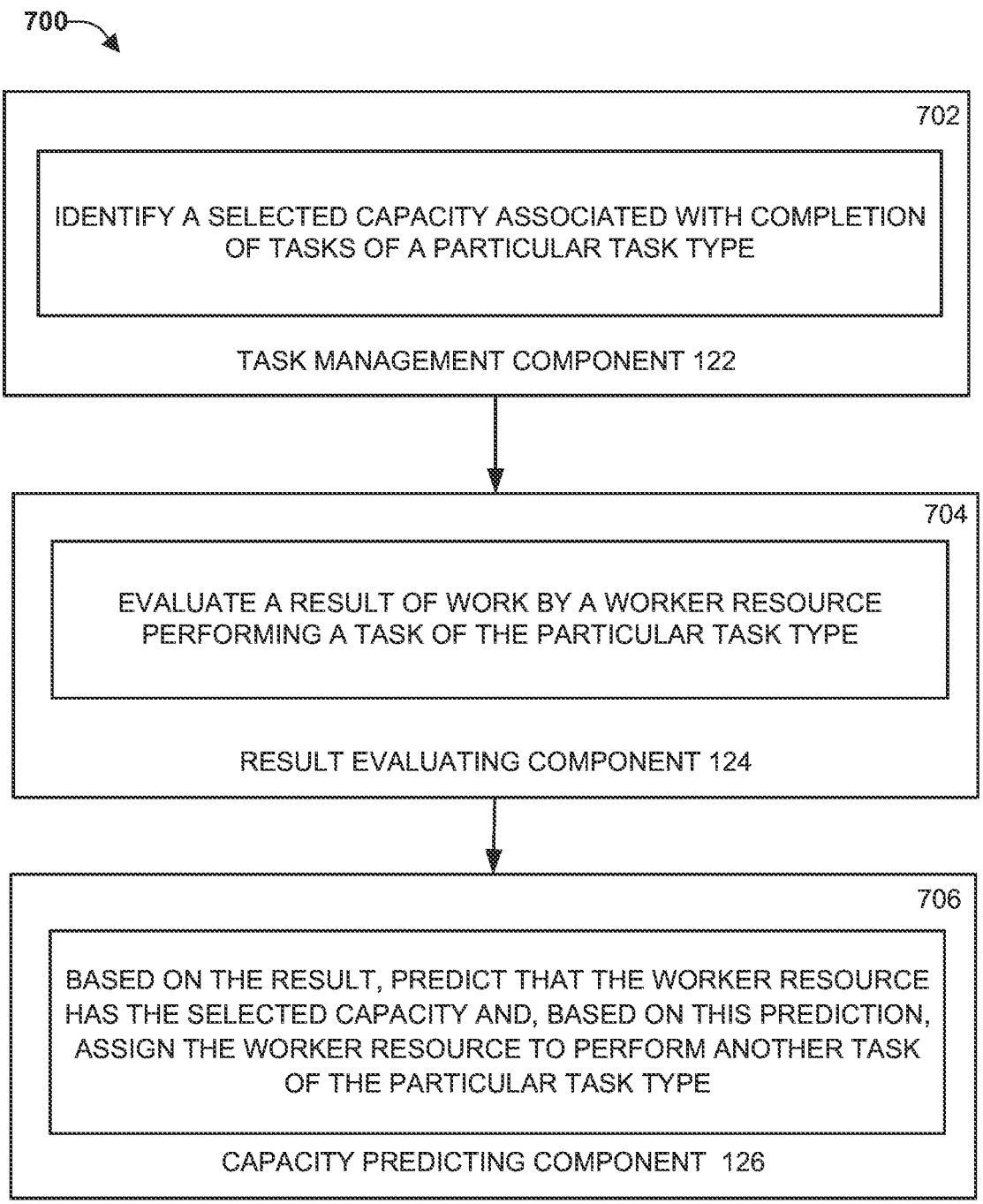
FIG. 7 depicts a system that can facilitate allocating a resource to perform a task based on a predicted capacity of the resource, in accordance with one or more embodiments.

FIG. 7 depicts a system 700 that can facilitate allocating a resource to perform a task based on a predicted capacity of the resource, in accordance with one or more embodiments. For purposes of brevity, description of like elements and/or processes employed in other embodiments is omitted. As depicted, system 700 can include task management component 122, result evaluating component 124, capacity predicting component 126, and other components described or suggested by different embodiments described herein, that can improve the operation of system 700.

In an example, component 702 can include the functions of task management component 122, supported by the other layers of system 700. For example, component 702 can identify a selected capacity associated with completion of tasks of a particular task type. In this and other examples, component 704 can include the functions of result evaluating component 124, supported by the other layers of system 700. Continuing this example, in one or more embodiments, component 704 can evaluate a result of work by a worker resource performing a task of the particular task type. Continuing this example, component 706 can include the functions of capacity predicting component 126, supported by the other layers of system 700. For example, component 706 can based on the result, predict that the worker resource has the selected capacity and, based on this prediction, assign the worker resource to perform another task of the particular task type.

Figure 8:
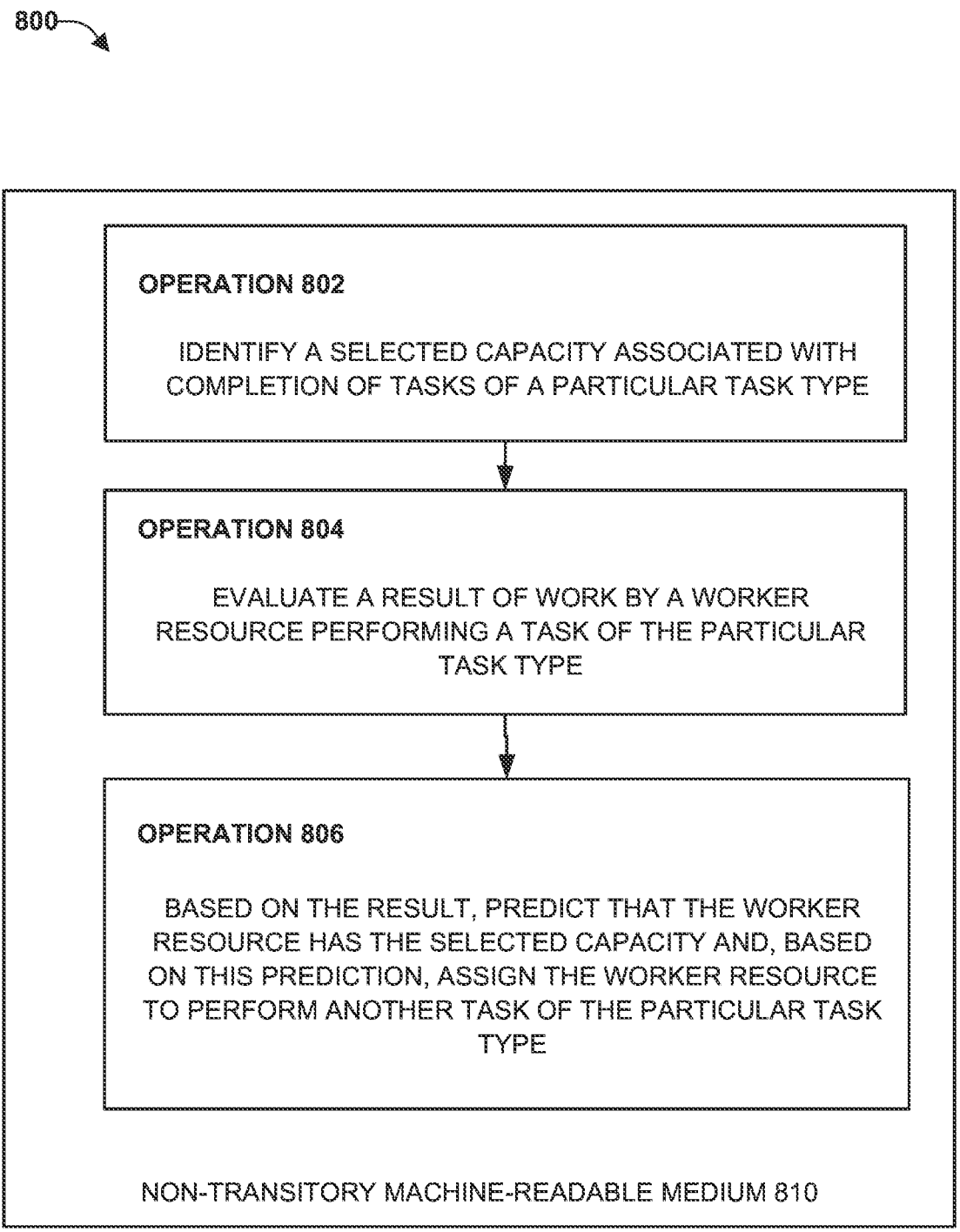
FIG. 8 depicts an example non-transitory machine-readable medium that can include executable instructions that, when executed by a processor of a system, facilitate allocating a resource to perform a task based on a predicted capacity of the resource, in accordance with one or more embodiments described above.

FIG. 8 depicts an example 800 non-transitory machine-readable medium 810 that can include executable instructions that, when executed by a processor of a system, facilitate allocating a resource to perform a task based on a predicted capacity of the resource, in accordance with one or more embodiments described above. For purposes of brevity, description of like elements and/or processes employed in other embodiments is omitted. As depicted, non-transitory machine-readable medium 810 includes executable instructions that can facilitate performance of operations 802-806.

In one or more embodiments, the operations can include operation 802 that can identify a selected capacity associated with completion of tasks of a particular task type. Operations can further include operation 804, that can evaluate a result of work by a worker resource performing a task of the particular task type. For example, in one or more embodiments operation 804 can evaluate a result of work by a worker resource performing a task of the particular task type. In one or more embodiments, the operations can include operation 806 that can, in one or more embodiments, based on the result, predict that the worker resource has the selected capacity and, based on this prediction, assign the worker resource to perform another task of the particular task type. For example, in one or more embodiments operation 806 can based on the result, predict that the worker resource has the selected capacity and based on this prediction, assign the worker resource to perform another task of the particular task type.

Figure 9:
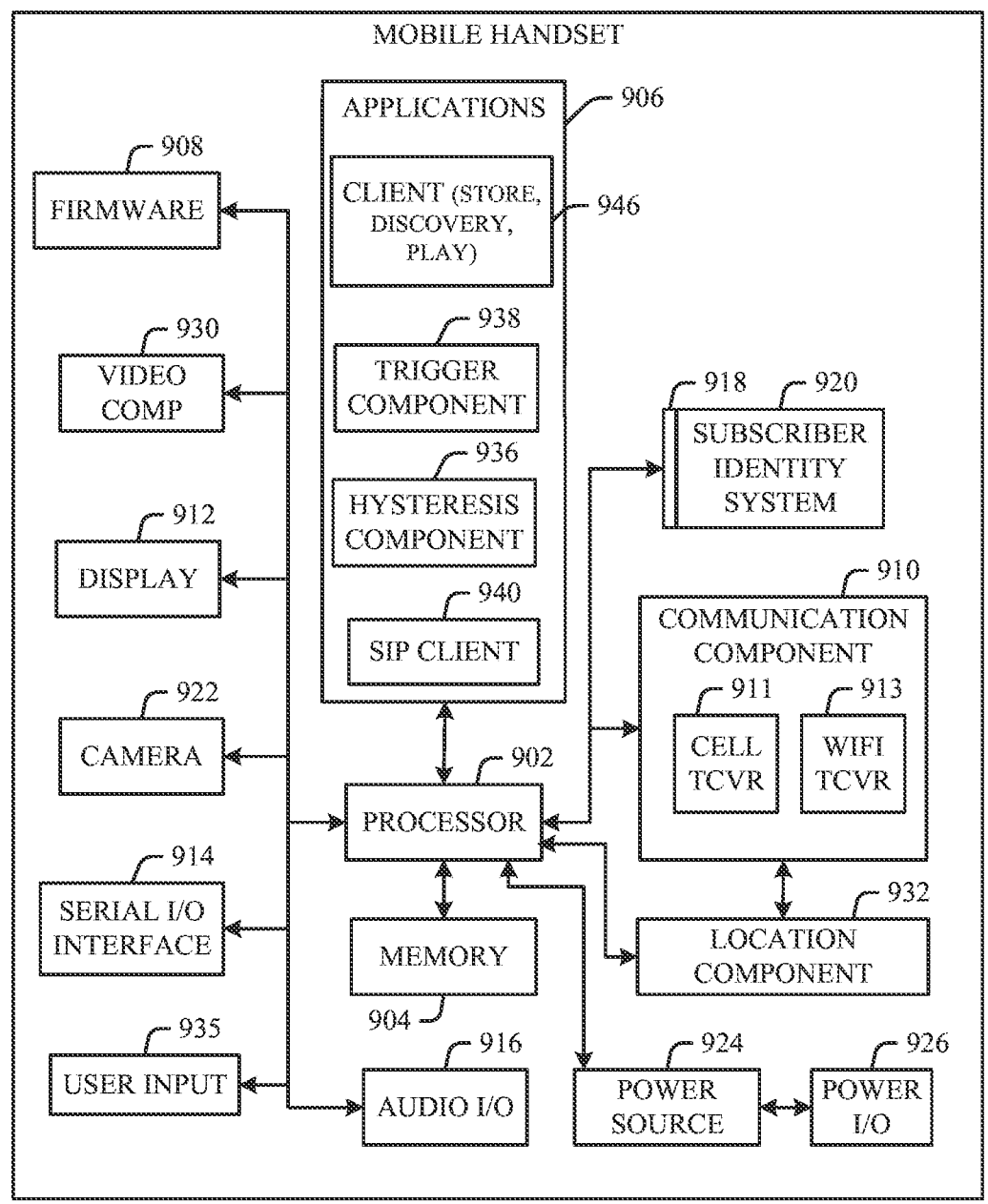
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
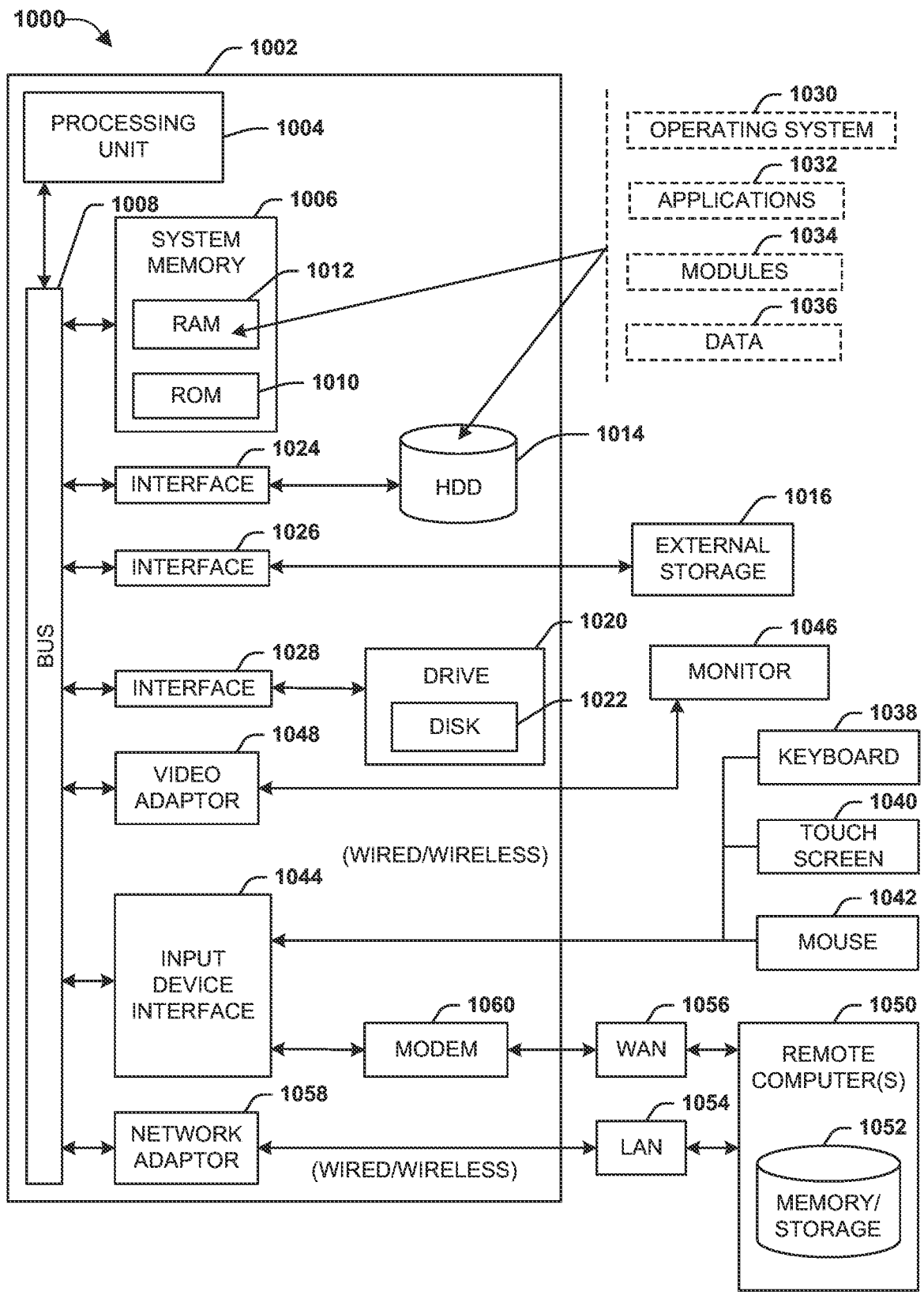
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:
1. A method, comprising:
identifying, by a system comprising a processor, a first capacity associated with completion of first tasks of a first task type;
identifying, by the system, collected production data representing a result of a workflow executed by a first worker resource of a plurality of worker resources having a plurality of tasks of a plurality of task types, wherein each of the plurality of tasks are associated with different capability and capacity;

generating a first training data set from the collected production data, wherein the first training data set comprises a first pseudorandom selection of the collected production data;

training, by the system, using the first capacity associated with completion of first tasks of a first task type and the first training data set, an artificial neural network (ANN) to predict resource capacities of the plurality of worker resources;

receiving, by the system, from the ANN, a prediction that the first worker resource has the first capacity;

generating a second training data set from the collected production data, wherein the second training data set comprises a second pseudorandom selection of the collected production data; and providing subsequent training of the ANN using the second training data set.

2. The method of claim 1, wherein ANN predicts the first capacity of the first worker resource based on the result being determined to be above a threshold level of success.

3. The method of claim 2, wherein the result being above the threshold level of success is associated with the first capacity being predicted for the first worker resource.

4. The method of claim 1, further comprising:
identifying, by the system, a second capacity associated with completion of the first tasks of the first task type;
based on the result, evaluating, by the system, the second capacity of the first worker resource as being below a threshold level of capacity; and
based on the first worker resource being evaluated to be below the threshold level, facilitating, by the system, assigning a resource to increase the second capacity of the first worker resource.

5. The method of claim 4, wherein the resource to increase the second capacity comprises a training resource for the second capacity.

6. The method of claim 4, further comprising:
identifying, by the system, a second task of the first task type assigned to a second worker resource;
based on analyzing historical task information associated with the second worker resource, evaluating, by the system, the first capacity of the second worker resource as being below the threshold level of capacity; and
based on the first capacity of the second worker resource being evaluated to be below the threshold level, allocating, by the system, the first worker resource to augment the first capacity of the second worker resource.

7. The method of claim 1, wherein the result comprises a performance metric for performance of the first task by the first worker resource.

8. The method of claim 7, wherein the performance metric comprises a completion time for completion of the first task.

9. The method of claim 7, wherein the performance metric comprises biometric data of the first worker resource.

10. The method of claim 1, wherein a task workflow comprises the first task and a second task of second tasks of a second task type, wherein the second task type is associated with a second capacity associated with completion of the second tasks of the second task type, and wherein the method further comprises:
based on the first worker resource being assigned to work on tasks of the task workflow, identifying, by the system, a second worker resource that has the second capacity; and
assigning, by the system, the second worker resource to work on the tasks of the task workflow.

11. The method of claim 10, further comprising, assigning, by the system, the second worker resource to augment the second capacity of the first worker resource during the work on the tasks of the task workflow.

12. The method of claim 1, further comprising:
identifying, by the system, a second task type as having a similarity to the first task type according to a threshold level of similarity; and
based on the similarity, identifying, by the system, the first capacity as being associated with completion of second tasks of the second task type.

13. The method of claim 1, further comprising, based on evaluated activity of the first worker resource, revising, by the system, the prediction of the first capacity for the first worker resource.

14. The method of claim 13, wherein the evaluated activity comprises evaluated past activity implicating the first capacity.

15. The method of claim 1, further comprising, based on evaluating performance of the first tasks of the first task type over a period of time, modifying, by the system, a characteristic of the first capacity.

16. A system, comprising:
a processor; and
a memory that stores executable instructions that, when executed by the processor, facilitate performance of operations, comprising:
identifying a first capacity associated with completion of first tasks of a first task type;
identifying collected production data representing a result of a workflow executed by a first worker resource of a plurality of worker resources having a plurality of tasks of a plurality of task types, wherein each of the plurality of tasks are associated with different capability and capacity;
generating a first training data set from the collected production data, wherein the first training data set comprises a first pseudorandom selection of the collected production data;
training an artificial neural network (ANN) within resource management equipment, using the first training data set;
communicating, to the resource management equipment, a request to perform a task associated with a first capability,
receiving a confirmation comprising a message that a worker resource has been allocated to perform the task by the ANN, wherein the worker resource was selected based on an assessment that the worker resource has the first capability as predicted by the ANN;
generating a second training data set from the collected production data, wherein the second training data set comprises a second pseudorandom selection of the collected production data; and
providing subsequent training of the ANN using the second training data set.

17. The system of claim 16, wherein the operations further comprise:
based on an analysis of a characteristic of the task, determining that the task has a further association with a second capability;
based on determining the further association with the second capability, updating the ANN within the resource management equipment regarding capabilities associated with the task; and receiving an indication from the resource management equipment that, based on a reassessment of the first worker resource, the first worker resource has the second capability as predicted by the ANN.

18. A non-transitory machine-readable medium comprising executable instructions that, when executed by a processor of a skill management device, facilitate performance of operations, the operations comprising:

identifying a first capacity associated with completion of first tasks of a first task type;

identifying collected production data representing a result of a workflow executed by a first worker resource of a plurality of worker resources having a plurality of tasks of a plurality of task types, wherein each of the plurality of tasks are associated with different capability and capacity;

generating a first training data set from the collected production data, wherein the first training data set comprises a first pseudorandom selection of the collected production data;

training an artificial neural network (ANN) within resource management equipment, using the first training data set;

determining that a skill is implicated by an activity performed to complete a job;

based on a review of historical records of a resource, identifying past performance of the activity by the resource;

providing the skill and the past performance to the ANN within the resource management equipment;

receiving, from the ANN within the resource management equipment, a conditional attribution of the skill to the resource;

generating a second training data set from the collected production data, wherein the second training data set comprises a second pseudorandom selection of the collected production data; and providing subsequent training of the ANN using the second training data set.

19. The non-transitory machine-readable medium of claim 18, wherein the operations further comprise:

evaluating a degree to which the resource utilizes the skill compared to a threshold level of competence; and based on the degree of utilization being determined to be above the threshold level of competence, confirming the conditional attribution of the skill to the resource.

20. The non-transitory machine-readable medium of claim 18, wherein the resource comprises a human resource.

* * * * *